（12）United States Patent
Ueda et al.

(10) Patent No.: US 10,108,182 B2
(45) Date of Patent: Oct. 23, 2018

(54) MOTOR CONTROL APPARATUS

(71) Applicant: Mitsubishi Electric Corporation, Tokyo (JP)

(72) Inventors: Koichiro Ueda, Tokyo (JP); Tatsuhiro Matsuda, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/546,692

(22) PCT Filed: Apr. 22, 2016

(86) PCT No.: PCT/JP2016/062785
§ 371 (c)(1),
(2) Date: Jul. 27, 2017

(87) PCT Pub. No.: WO2017/183187
PCT Pub. Date: Oct. 26, 2017

(65) Prior Publication Data
US 2018/0120820 A1 May 3, 2018

(51) Int. Cl.
*H02P 29/20* (2016.01)
*G05B 19/416* (2006.01)

(52) U.S. Cl.
CPC ............ *G05B 19/416* (2013.01); *H02P 29/20* (2016.02)

(58) Field of Classification Search
CPC ............................ H02P 29/0005; H02P 29/20
See application file for complete search history.

(56) References Cited

U.S. PATENT DOCUMENTS 5,705,755 A * 1/1998 Yamamura ............... G05D 3/20
73/862.191
5,952,801 A * 9/1999 Boisvert ............... H02H 7/0851
318/468

(Continued)

FOREIGN PATENT DOCUMENTS

JP 04-369520 A 12/1992
JP 2002-177352 A 6/2002

(Continued)

OTHER PUBLICATIONS

Written Opinion of the International Searching Authority of PCT/JP2016/062785 dated Jul. 19, 2016.

(Continued)

*Primary Examiner* — Bentsu Ro
(74) *Attorney, Agent, or Firm* — Sughrue Mion, PLLC; Richard C. Turner

(57) ABSTRACT

A control unit includes a position command generation unit generating a position command, a position control unit outputting a first speed command such that detected position tracks the position command, a pressure command generation unit generating a pressure command, a pressure control unit outputting a second speed command such that detected pressure or force tracks the pressure command, a speed command selection unit selecting creep speed, the first speed command, or the second speed command and outputs it as a speed command for the motor to operate; and a speed control unit outputting a current command for supplying current to the motor such that the motor speed tracks the speed command output by the speed command selection unit. After selecting the first speed command, the speed command selection unit selects the second speed command or the creep speed at timing when the first speed command falls below the creep speed.

14 Claims, 9 Drawing Sheets

(56) References Cited

U.S. PATENT DOCUMENTS

| | | | | |
|---|---|---|---|---|
| 6,274,947 B1 * | 8/2001 | Terashima | ........... | H02H 7/0851 307/10.1 |
| 2006/0012326 A1 | 1/2006 | Iwashita et al. | | |
| 2006/0249038 A1 | 11/2006 | Futamura et al. | | |
| 2013/0038265 A1 | 2/2013 | Igarashi et al. | | |

FOREIGN PATENT DOCUMENTS

| | | | |
|---|---|---|---|
| JP | 2005-178285 A | 7/2005 | |
| JP | 2006-007296 A | 1/2006 | |
| JP | 3854602 B2 | 12/2006 | |
| JP | 2007-082279 A | 3/2007 | |
| JP | 2011-251301 A | 12/2011 | |
| WO | 2005/056280 A1 | 6/2005 | |
| WO | 2011/145366 A1 | 11/2011 | |

OTHER PUBLICATIONS

International Search Report of PCT/JP2016/062785 dated Jul. 19, 2016.

* cited by examiner

| SETTING ITEM OF PROCESSING ACTION | | |
|---|---|---|
| PRESSURE TO BE APPLIED TO WORKPIECE | | Pa |
| AMOUNT OF MOVEMENT FOR MOVING TO POSITION BEFORE WORKPIECE | | mm |
| CREEP SPEED | | mm/s |

FIG.4
(A)
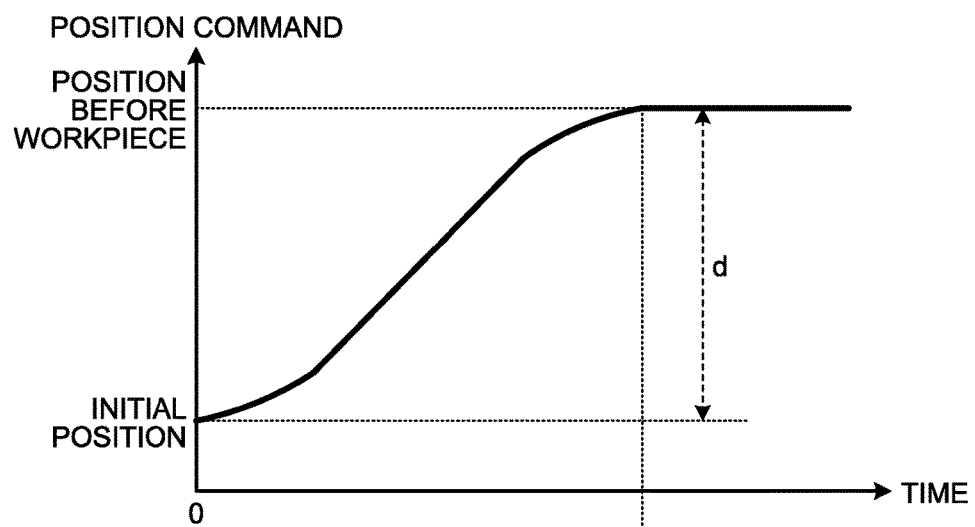
(B)
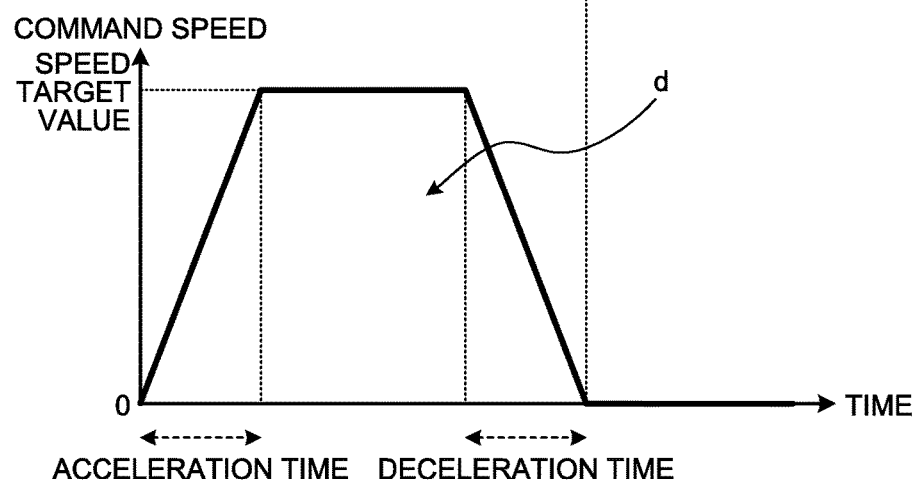

110

120

120-3A

MOTOR CONTROL APPARATUS

CROSS REFERENCE TO RELATED APPLICATIONS

This application is a National Stage of International Application No. PCT/JP2016/062785 filed Apr. 22, 2016, the contents of which are incorporated herein by reference in its entirety.

FIELD

The present invention relates to a motor control apparatus.

BACKGROUND

Industrial machines, such as bonding apparatuses used in semiconductor manufacturing processes and various forming machines that perform press forming or powder forming, perform processing while a pressurizing head, which is a motor-driven mechanical load, applies a force on a workpiece, which is a subject to be pressurized. In the case of the bonding apparatuses, an electronic substrate, a film, an IC chip, a semiconductor package, or a wafer corresponds to the workpiece, and in the case of the forming machines, metal, powder in a mold, or resin to be formed corresponds to the workpiece. Such bonding apparatuses or forming machines include a sensor, typified by a load cell, that detects force or pressure in a pressurizing head or in a mechanism that drives the pressurizing head to control the motion of a motor such that the force or pressure applied to various workpieces achieves a desired value. The motor here is an electric motor for driving the pressurizing head.

The industrial machines described above first position the pressurizing head in a place away from the workpiece and not in contact with the workpiece and perform a feeding action such that the pressurizing head approaches the workpiece. When the pressurizing head comes in contact with the workpiece, then, the industrial machines described above perform a pressurizing action on the basis of a signal detected by the sensor that detects the force or pressure. Thus, the industrial machines described above need control to switch from the feeding action to the pressurizing action by an appropriate means. Generating a shock or vibration during the switching is of course not preferable for the machines including the pressurizing head and the workpieces.

Techniques to control the action of a motor while performing the switching from the feeding action to the pressurizing action in such a manner is disclosed in Patent Literatures 1 and 2. Patent Literature 1 discloses a technique to calculate the ratio of a torque command and a pressure sensor value after a feeding action is performed with position control and to switch the control to a pressure controller when the ratio is stabilized at a constant value. Patent Literature 2 discloses a technique to, when an injection screw of an injection molding machine is the body to be driven, detect a position deviation of the body to be driven with respect to the target position, calculate a first speed command on the basis of the position deviation, and generate a second speed command that corresponds to the target speed of the body to be driven. Patent Literature 2 also discloses a technique to perform proportional integral (PI) compensation processing on an injection pressure deviation to generate a third speed command and select the smallest speed command value from among the first speed command, the second speed command, and the third speed command as the speed command for driving the motor.

CITATION LIST

Patent Literature

Patent Literature 1: Japanese Patent Application Laid-open No. 2007-82279
Patent Literature 2: Japanese Patent Application Laid-open No. 2005-178285

SUMMARY

Technical Problem

The technique disclosed in Patent Literature 1 however has problems as described below. The pressurizing mechanism, which is driven by the motor, needs to be switched from a state in which it is not in contact with a workpiece to a state in which it is in contact with the workpiece. The moment when this switching takes place is an unsteady situation, which keeps the ratio of the torque command value and the pressure sensor value inconstant and thereby causes a delay to the timing at which the switching to the pressurizing action is performed; as a result, undesirable force and pressure act on the workpiece. Additionally, the control based on the position controller is performed in the moment when the contact is made to the workpiece; thus, depending on the condition of the command value to be input to the position controller, the pressurizing mechanism may forcefully collide with the workpiece at the moment when the contact is made to the workpiece. This is problematic in that the workpiece or the pressurizing head can be damaged.

In the technique disclosed in Patent Literature 2, the smallest value is selected from among the first speed command, the second speed command, and the third speed command; thus, the overall motion of the pressurizing head may be slow. This is problematic in that the time taken for the pressurizing head to reach the workpiece is prolonged and thereby the productivity of the machine that performs the pressurization processing is lowered.

The present invention has been achieved in view of the above, and an object of the present invention is to provide a motor control apparatus that can shorten the time for a feeding action, which is an action performed until a pressurizing head approaches near a workpiece, and can achieve a switching action from the feeding action to a pressurizing action without a shock.

Solution to Problem

To solve the problems described above and achieve the object, a motor control apparatus according to the present invention is a motor control apparatus that controls a motor that includes an encoder, includes: a position command generation unit to generate a position command that is a command value that causes a mechanical load driven by the motor to approach a subject to be pressurized and that causes a final position of the mechanical load to be before the subject to be pressurized at a certain distance from the subject to be pressurized; and a position control unit to output a first speed command such that a position of the motor detected by the encoder tracks the position command. The motor control apparatus according to the present invention includes: a pressure command generation unit to generate a pressure command that is a command value of a pressure or a force to be applied to the subject to be pressurized; and a pressure control unit to output a second speed command such that, when the mechanical load is pressed against the subject to be pressurized, a pressure or a force detected on the mechanical load tracks the pressure command. The motor control apparatus according to the present invention includes: a speed command selection unit to select one of a creep speed that specifies an upper limit of a speed of the motor to be used when the mechanical load comes into contact with the subject to be pressurized, the first speed command, and the second speed command and output the selected one of the creep speed, the first speed command, and the second speed command as a speed command for the motor to operate; and a speed control unit to output a current command for supplying a current to the motor such that the speed of the motor tracks the speed command output by the speed command selection unit. After the speed command selection unit selects the first speed command, the speed command selection unit selects one of the second speed command and the creep speed that has a smaller value at and after a timing when the first speed command falls below the creep speed.

Advantageous Effects of Invention

The present invention produces an effect of shortening the time for a feeding action, which is an action performed until a pressurizing head approaches near a workpiece, and achieving a switching action from the feeding action to a pressurizing action without a shock.

BRIEF DESCRIPTION OF DRAWINGS

FIGS. 4(A) and 4(B) are diagrams illustrating an exemplary position command generated by a position command generation unit illustrated in FIG. 3 and an exemplary command speed acquired by differentiation of the position command.

DESCRIPTION OF EMBODIMENTS

A motor control apparatus according to exemplary embodiments of the present invention will now be described in detail with reference to the drawings. The present invention is not limited to the embodiments.

First Embodiment

Figures 1, 2:
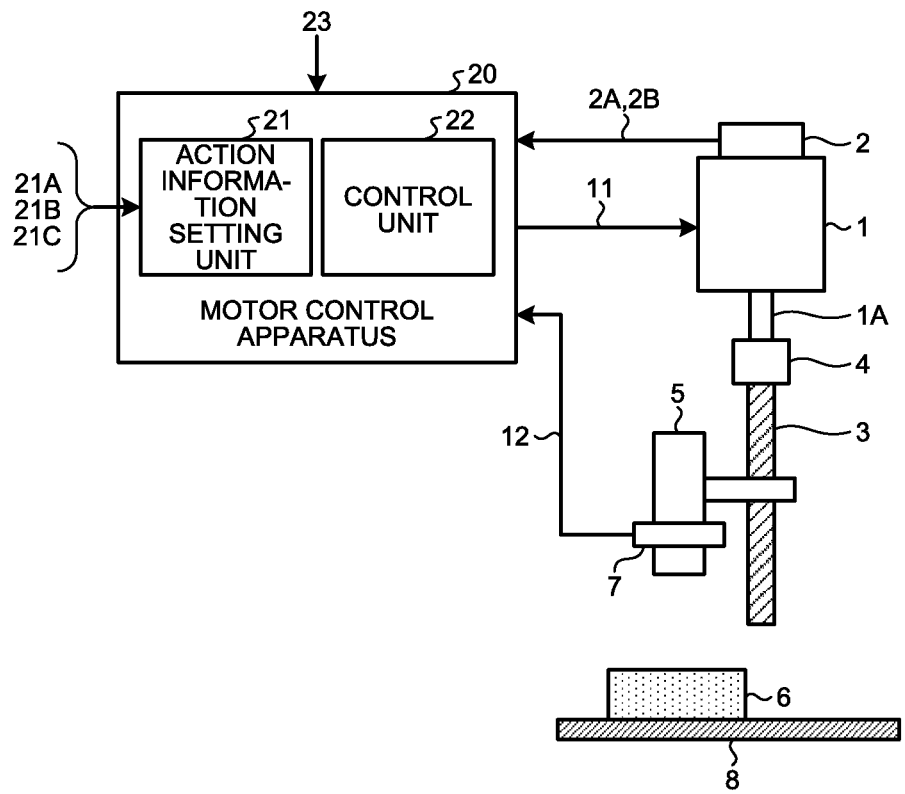
FIG. 1 is a diagram illustrating the configuration of a motor control apparatus according to a first embodiment of the present invention, a motor, a pressurizing head, and a workpiece.
FIG. 2 is a diagram representing an exemplary screen display to input various types of information to an action information setting unit illustrated in FIG. 1.

FIG. 1 is a diagram illustrating the configuration of a motor control apparatus according to a first embodiment of the present invention, a motor, a pressurizing head, and a workpiece. A motor 1 is a subject to be controlled by a motor control apparatus 20 according to the first embodiment, is driven with a current 11 supplied from the motor control apparatus 20, and is a driving source for operating a pressurizing head 5. The pressurizing head 5 is a mechanical load driven by the motor 1. A workpiece 6 is a subject to be pressurized that is placed on a table 8 and is processed with the pressurizing head 5 being in contact with the workpiece 6 and pressurizing the workpiece 6.

An encoder 2, which is attached to the motor 1, detects the rotational position of the motor 1 and the rotational speed of the motor 1, outputs the detected position as a position feedback signal 2A, and outputs the detected rotational speed as a speed feedback signal 2B. A ball screw 3, which is a mechanical drive unit for converting the rotational motion of the motor 1 to a translational motion, is placed at a rotation shaft 1A of the motor 1. The motor 1 and the ball screw 3 are coupled together with a coupling 4. The pressurizing head 5 is coupled to the ball screw 3, and, as the pressurizing head 5 travels downward relative to the drawing plane and comes in contact with the workpiece 6, pressurization processing of the workpiece 6 is achieved.

The pressurizing head 5 is located at a certain distance from the workpiece 6 at first, and then, after performing a feeding action to approach the workpiece 6, the pressurizing head 5 applies a pressure to the workpiece 6 to achieve the pressurization processing on the workpiece 6. After the completion of the pressurization processing on the workpiece 6 illustrated in FIG. 1, when the workpiece 6 illustrated in FIG. 1 is replaced with an undepicted workpiece 6 to be processed subsequently, the pressurizing head 5 needs to be retracted away from the workpiece 6. Hence, when the pressurization processing is performed on the workpiece 6, the pressurizing head 5 is located at a certain distance from the workpiece 6, and it is necessary to cause the pressurizing head 5 to perform an action from this position so as to perform the pressurization processing on the workpiece 6.

A load detection sensor 7, which detects a force or a pressure and outputs the detected force or pressure as a pressure feedback signal 12, is attached to the pressurizing head 5. Examples of the load detection sensor 7 can include a load cell. A load cell is a sensor that detects a force, but when a value obtained by dividing the detected force by the area of the cross section of the pressurizing head 5 is used, the load cell can be regarded as detecting a pressure.

The motor control apparatus 20 includes an action information setting unit 21, and various types of information such as pressure information 21A, amount-of-movement information 21B, and creep speed information 21C are input to the action information setting unit 21. The pressure information 21A is information on a pressure or a force to be applied to the workpiece 6. The amount-of-movement information 21B is the amount of movement for the pressurizing head 5 to move, after it commences an action, to a position before a position in which it comes in contact with the workpiece 6. The creep speed information 21C is the creep speed that specifies an upper limit of the speed to be used when the pressurizing head 5 comes into contact with the workpiece 6. The amount-of-movement information 21B and the creep speed information 21C input to the action information setting unit 21 may be simply referred to as the amount of movement and the creep speed in the description below.

Here, the amount of movement for the pressurizing head 5 to move, after it commences an action, to a position before a position in which it comes in contact with the workpiece 6, i.e., the position at a certain distance from the workpiece 6, represents the amount of movement for the pressurizing head 5 to move from its initial position, in which it starts the feeding action, to a position before a position in which it comes in contact with the workpiece 6. The amount of movement can be easily set on the basis of the thickness of the workpiece 6 and the position in which the pressurizing head 5 is located initially. The speed having a small value that does not pose a problem even if a collision with the workpiece 6 occurs is normally set as the creep speed.

FIG. 2 is a diagram representing an exemplary screen display to input the various types of information to the action information setting unit illustrated in FIG. 1. Exemplary setting items for a processing action to be indicated on a display placed for the motor control apparatus 20 are illustrated in FIG. 2. Examples of the setting items can include "pressure to be applied to workpiece", "amount-of-movement for moving to position before workpiece", and "creep speed". By a user inputting values for these setting items on the display, the pressure information 21A, the amount-of-movement information 21B, and the creep speed information 21C are input to the action information setting unit 21 illustrated in FIG. 1. In this manner, at least these three types of information are input to the action information setting unit 21 in some type of form.

In place of inputting the various types of information to the action information setting unit 21 using a display as illustrated in FIG. 2, table information associated with the various types of information for each workpiece 6 may be stored in advance in a memory in the motor control apparatus 20, and, when a user selects the workpiece 6 to be processed, information associated with the workpiece 6 is read from the table information stored in advance, and the obtained information may be used as the pressure information 21A, the amount-of-movement information 21B, and the creep speed information 21C illustrated in FIG. 1. The pressure information 21A, which is information on a pressure or a force to be applied to the workpiece 6, may not necessarily be a single numerical value and may be, depending on the workpiece 6, a time profile of pressure or force to be desirably applied.

A control unit 22 in the motor control apparatus 20 illustrated in FIG. 1 controls the current 11 to be supplied to the motor 1 on the basis of various types of information input to the action information setting unit 21, the position feedback signal 2A output from the encoder 2, the speed feedback signal 2B output from the encoder 2, and the pressure feedback signal 12 output form the load detection sensor 7. By controlling the current 11 to be supplied to the motor 1, the feeding action and the pressurizing action of the pressurizing head 5 are achieved.

The control unit 22, which achieves the feeding action and the pressurizing action of the pressurizing head 5, is described below in detail.

Figure 3:
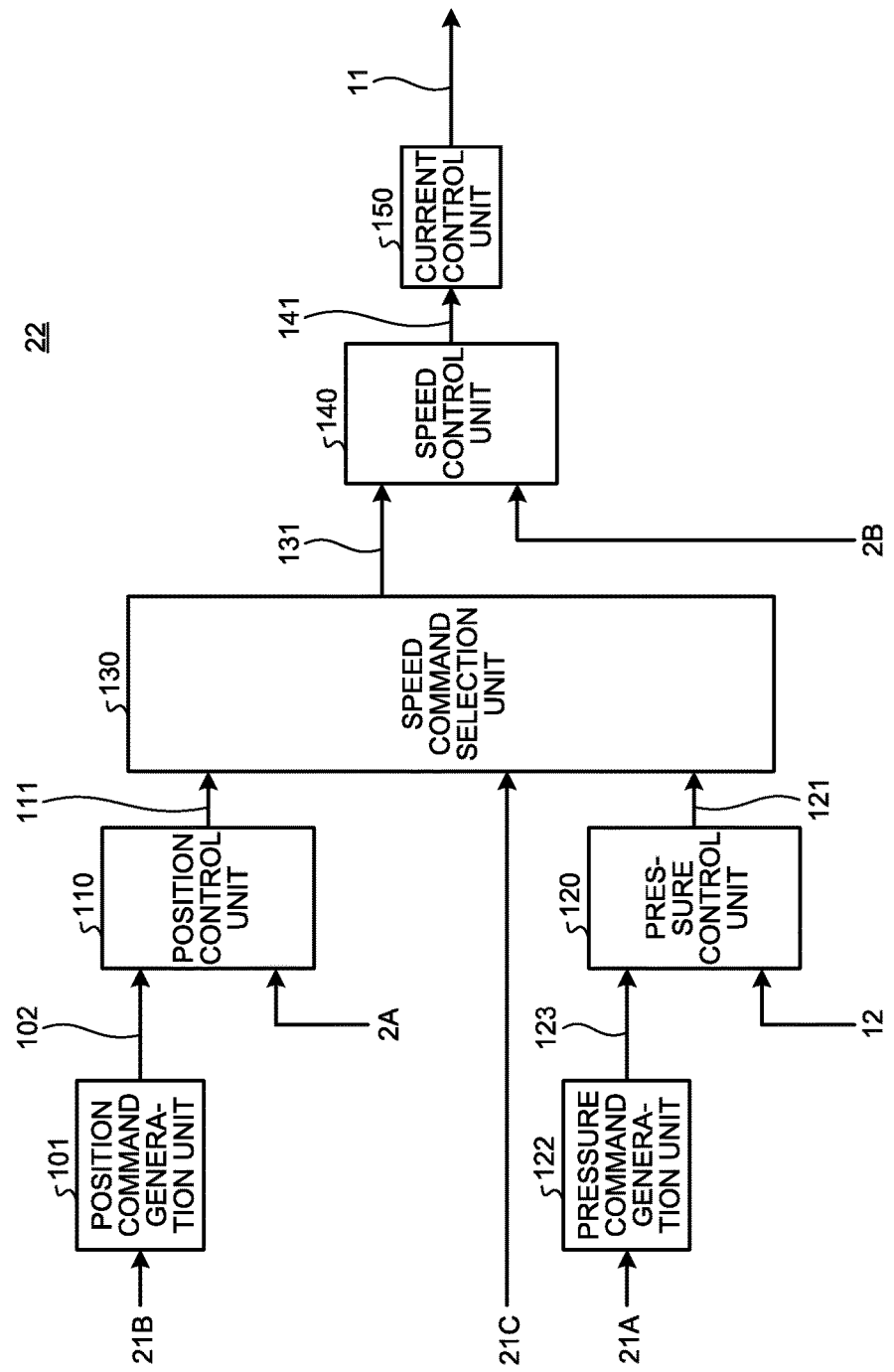
FIG. 3 is a function block diagram of a control unit illustrated in FIG. 1.

FIG. 3 is a function block diagram of the control unit illustrated in FIG. 1. The control unit 22 includes a position command generation unit 101, which, upon determining that a pressurizing action sequence is started, generates a position command 102 for performing the feeding action on the basis of the amount of movement for the pressurizing head 5 to move to the position before the workpiece 6; and a position control unit 110, which outputs a first speed command 111 that serves as a speed at which the motor 1 should operate in order for the position feedback signal 2A to track the position command 102.

The position command 102 generated by the position command generation unit 101 is a command that causes the final position of the pressurizing head 5 to be a position before the workpiece 6 in which the pressurizing head 5 is not in contact with the workpiece 6. The position command generation unit 101 generates a position command on the basis of a speed target value, an acceleration time, or a deceleration time set in the position command generation unit 101, or generates a trapezoidal or triangular speed command that is acquired by differentiation of the position command. Here, setting the maximum speed or the rated speed of the motor 1 and, additionally, the maximum speed at which the pressurizing head 5 is operable as the speed target value described above produces an action pattern particularly suitable to shorten the action time of the feeding action.

FIG. 4 is a diagram illustrating an exemplary position command generated by the position command generation unit illustrated in FIG. 3 and an exemplary command speed acquired by differentiation of the position command. In FIG. 4(A), the vertical axis represents the position command and the horizontal axis represents time. In FIG. 4(A), an initial position, which is a position of the pressurizing head 5 before commencing the feeding action, a position before the workpiece, which is a position of the pressurizing head 5 at a certain distance from the workpiece 6 after commencing the feeding action, and an amount of movement d by which the pressurizing head 5 moves from the initial position to the position before the workpiece are illustrated. In FIG. 4(A), the time at which the motor 1 is started in response to the receipt of a starting signal 23 by the control unit 22 illustrated in FIG. 1 is zero.

In FIG. 4(B), the vertical axis represents the command speed, which is the time derivative of the position command, and the horizontal axis represents the time. In FIG. 4(B), an example in which the command speed is trapezoidal is illustrated. Note that the command speed is not limited to trapezoidal ones and may be of an acceleration/deceleration pattern in the shape of the letter S, and it may be in any shape as long as it is in a pattern that starts with a stopped state, then performing an acceleration action and a deceleration action, and going back to the stopped state. In FIG. 4(B), the area of the trapezoidal shape surrounded by the command speed and time axes corresponds to the amount of movement d by which the pressurizing head 5 moves from the initial position to the position before the workpiece. In FIG. 4(B), the time at which the motor is started in response to the receipt of the starting signal 23 by the control unit 22 illustrated in FIG. 1 is zero.

Figure 5:
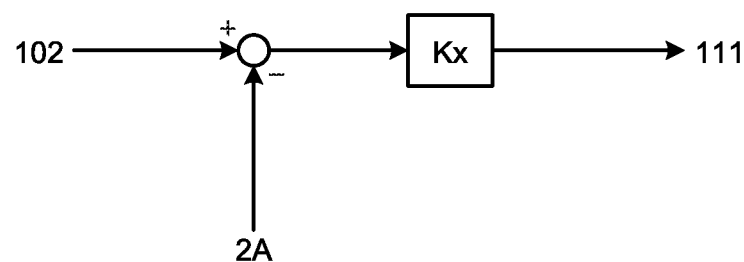
FIG. 5 is a diagram illustrating an exemplary configuration of a position control unit illustrated in FIG. 3.

FIG. 5 is a diagram illustrating an exemplary configuration of the position control unit illustrated in FIG. 3. Examples of the control of the position control unit 110 can include a proportional (P) control in which the difference between the position command 102 and the position feedback signal 2A is multiplied by a gain Kx to output the first speed command 111.

The control unit 22 illustrated in FIG. 3 also includes a pressure command generation unit 122, which generates, on the basis of the pressure information 21A, a pressure command 123 that serves as a reference signal for performing pressure control. When the pressure information 21A to be applied to the workpiece 6 is a single numerical value, the pressure command generation unit 122 generates, as the pressure command 123, a step signal having a magnitude of a pressure value to be applied to the workpiece 6. When the pressure information 21A is input as a time profile, the pressure command generation unit 122 generates the pressure command 123 that takes the time profile at or after pressurization commencement time.

The control unit 22 illustrated in FIG. 3 also includes a pressure control unit 120, which outputs a second speed command 121 that serves as a speed at which the motor 1 should operate in order for the pressure feedback signal 12 to track the pressure command 123 to be applied to the workpiece 6.

Figure 6:
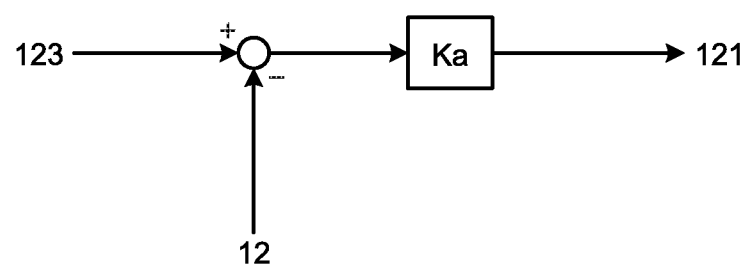
FIG. 6 is a diagram illustrating an exemplary configuration of a pressure control unit illustrated in FIG. 3.

FIG. 6 is a diagram illustrating an exemplary configuration of the pressure control unit illustrated in FIG. 3. Examples of the control of the pressure control unit 120 can include the P control in which the difference between the pressure command 123 and the pressure feedback signal 12 is multiplied by a gain Ka to output the second speed command 121, as in FIG. 6. Here, the gain Ka is set to an appropriate value such that overshooting or oscillation is not caused when the pressurizing action is performed and that the control performance as pressure control is maintained to a certain degree. The pressure control unit 120 performs an operation for the pressure control from when the starting signal 23 illustrated in FIG. 1 is received until the pressurizing action is completed to calculate the second speed command 121.

The control unit 22 illustrated in FIG. 3 also includes a speed command selection unit 130. The speed command selection unit 130 performs processing to select one of the first speed command 111, the creep speed information 21C, and the second speed command 121 from when the starting signal 23 illustrated in FIG. 1 is received until the pressurizing action is completed to select the speed to be provided to the motor 1 and outputs the resultant speed as a speed command 131. The detailed operation of the speed command selection unit 130 will be described hereinafter.

The control unit 22 illustrated in FIG. 3 also includes a speed control unit 140, which outputs a current command 141 that serves as a reference signal for the current 11 to be supplied to the motor 1 in order for the speed feedback signal 2B to track the speed command 131. An exemplary configuration of the speed control unit 140 is as described below. The speed control unit 140 performs a PI control on the difference between the speed command 131 and the speed feedback signal 2B to output the current command 141. The control of the speed control unit 140 is not limited to a PI control and it may be a proportional integral differential (PID) control.

The control unit 22 illustrated in FIG. 3 also includes a current control unit 150, which supplies the current 11 to the motor 1 in accordance with the current command 141. An exemplary configuration of the current control unit 150 is as described below. The current control unit 150 includes a converter circuit, which converts an AC power source to a DC power source, or an inverter circuit, which converts a DC power source to a desired AC voltage command, and performs PWM control to apply a voltage to the motor 1 and supply the current 11 such that the current 11 tracks the current command 141.

Figure 7:
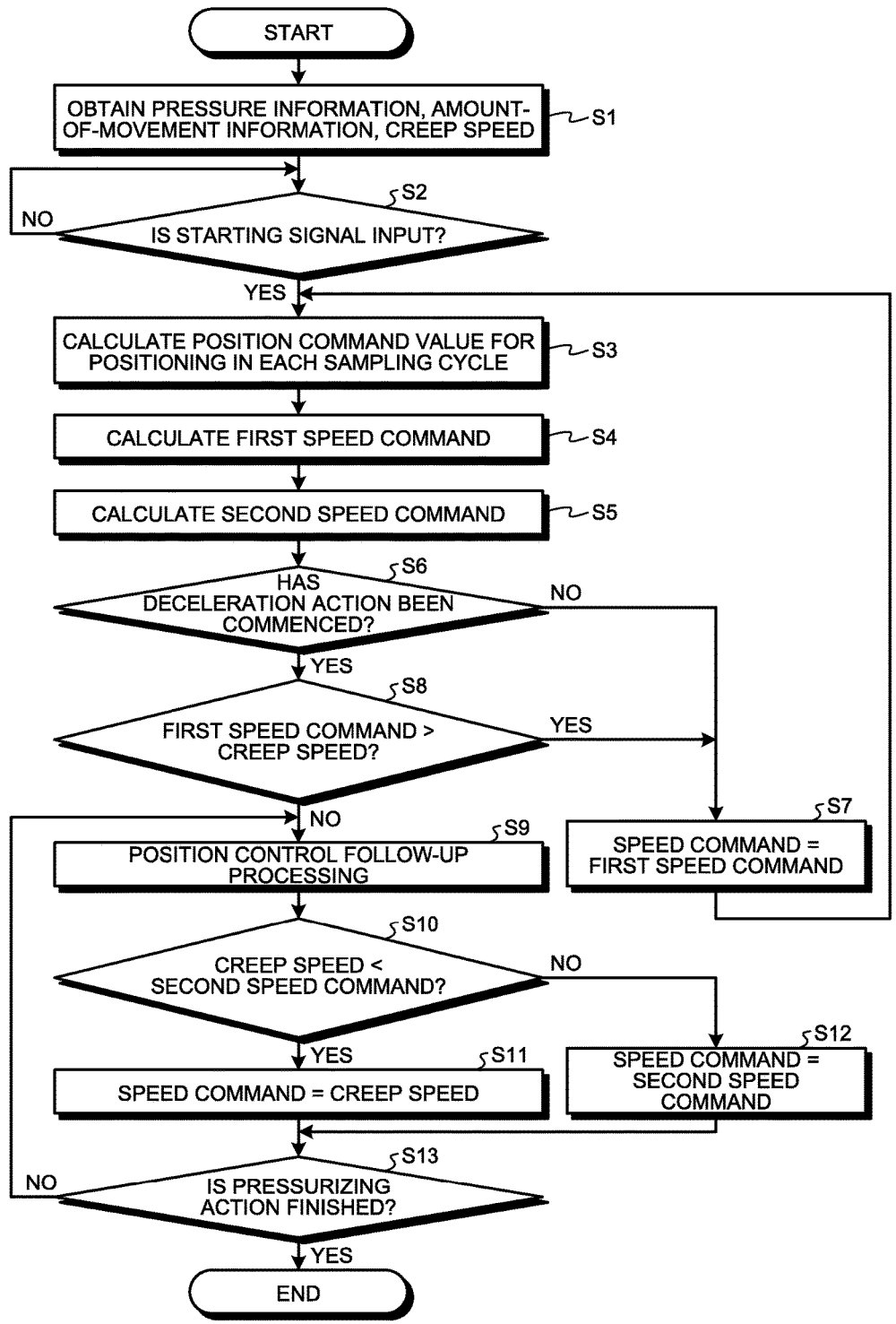
FIG. 7 is a flowchart for describing the operation of the motor control apparatus according to the first embodiment of the present invention.

FIG. 7 is a flowchart for describing the operation of the motor control apparatus according to the first embodiment of the present invention, and describes, in detail, the processing of the control unit 22, particularly the speed command selection unit 130, illustrated in FIG. 3. The processing illustrated in FIG. 7 is described with an assumption that the processing is performed every certain control sampling cycle.

In S1, the control unit 22 obtains the pressure information 21A to be applied to the workpiece 6, the amount-of-movement information 21B for the pressurizing head 5 to move to a position before the workpiece 6, and the creep speed information 21C from the action information setting unit 21.

In S2, the control unit 22 determines whether the starting signal 23 is input. If the starting signal 23 is not input (S2, No), the processing in S2 is performed again and it is determined whether the starting signal 23 is input. If the starting signal 23 is input (S2, Yes), the control unit 22 performs processing in S3.

In S3, the position command generation unit 101 calculates the position command 102 for the pressurizing head 5 to move by the amount of movement given in S1. That is, the position command generation unit 101 calculates a position command value for positioning in each sampling cycle. A specific example of the position command 102 is as described in FIG. 4.

In S4, the position control unit 110 calculates the first speed command 111 on the basis of the position command 102 and the position feedback signal 2A.

In S5, the pressure control unit 120 calculates the second speed command 121, which is a speed command for the pressure feedback signal 12 to track the pressure command 123.

In S6, the speed command selection unit 130 determines whether the deceleration action has been commenced. Specific exemplary methods by which it is determined whether the deceleration action has been commenced can include a method in which it is determined whether the command speed is smaller than that at a previous sampling time.

If the deceleration action is not commenced in S6 (S6, No), the speed command selection unit 130 outputs in S7 the first speed command 111 as the speed command 131.

When the processing in S7 is completed, the control unit 22 performs again the processing in S3 and following processing at the subsequent control sampling cycle.

If the deceleration action has been commenced in S6 (S6, Yes), the speed command selection unit 130 performs processing in S8. In S8, the speed command selection unit 130 compares the first speed command 111 to the creep speed and, if the first speed command 111 is greater than the creep speed (S8, Yes), performs the processing in S7. In S7, the first speed command 111 is selected as described above.

In S8, if the first speed command 111 is less than or equal to the creep speed (S8, No), the speed command selection unit 130 performs processing in S9.

In S9, position control follow-up processing is performed. The position control follow-up processing is processing in which, while the speed command selection unit 130 selects the creep speed or the second speed command 121, the position control unit 110 overwrites the position command 102 with a value of the present position feedback signal 2A.

In S10, the speed command selection unit 130 compares the second speed command 121 to the creep speed. If the creep speed is less than the second speed command 121 (S10, Yes), the speed command selection unit 130 performs processing in S11. In S11, the speed command selection unit 130 outputs the creep speed as the speed command 131.

In S10, if the creep speed larger than or equal to the second speed command 121 (S10, No), i.e., if the second speed command 121 is smaller than or equal to the creep speed, the speed command selection unit 130 performs processing in S12. In S12, the speed command selection unit 130 outputs the second speed command 121 as the speed command 131.

When the processing in S11 or S12 is completed, the control unit 22 performs processing in S13. In S13, the control unit 22 determines whether the pressurizing action is finished. Exemplary methods by which it is determined whether the pressurizing action is finished can include a method in which it is determined whether a certain pressure has been applied to the workpiece 6 continuously over a certain time, i.e., whether a certain pressure signal has continued over a certain time.

In S13, if the pressurization processing is not finished (S13, No), the control unit 22 performs again the processing in S9 and following processing at the subsequent control sampling cycle. In S12, if the pressurization processing is finished (S13, Yes), a series of the feeding action and the pressurizing action is completed.

Effects of the first embodiment will now be described.

Figure 8:
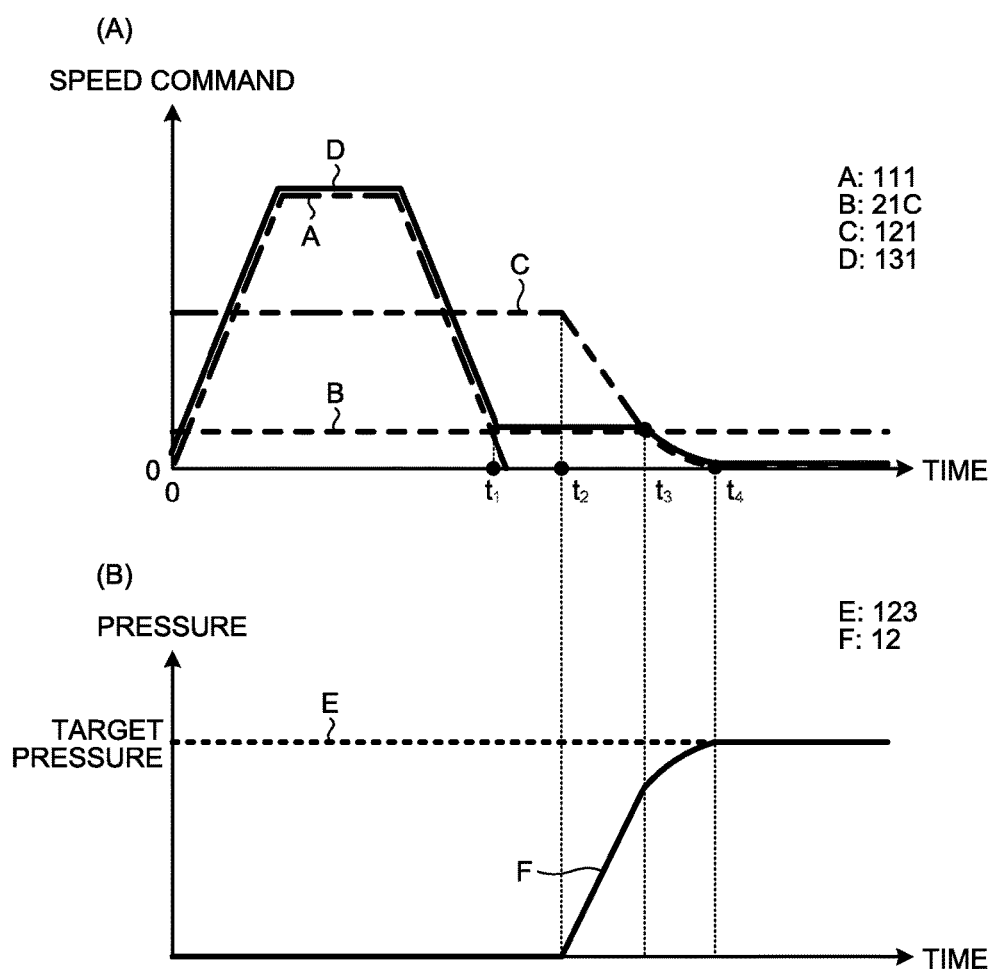
FIGS. 8(A) and 8(B) are diagrams representing a speed command and a pressure calculated by the motor control apparatus according to the first embodiment of the present invention.

FIG. 8 is a diagram representing the speed command and the pressure calculated by the motor control apparatus according to the first embodiment of the present invention. In FIG. 8(A), waveforms of various speed commands calculated by the motor control apparatus are illustrated. In FIG. 8(A), the vertical axis represents the speed command and the horizontal axis represents the time. In FIG. 8(B), waveforms of pressures are illustrated. In FIG. 8(B), the vertical axis represents the pressure and the horizontal axis represents the time. In FIGS. 8(A) and (B), the timing at which the control unit 22 illustrated in FIG. 1 receives the starting signal 23 is zero.

Lines A to D illustrated in FIG. 8(A) are as described below.

(1) An alternate long and short dash line A represents the first speed command 111 illustrated in FIG. 3 and is referred to as the command A hereinafter.

(2) A broken line B represents the creep speed information 21C illustrated in FIG. 3 and is referred to as the speed B hereinafter.

(3) A chain double dashed line C represents the second speed command 121 illustrated in FIG. 3 and is referred to as the command C hereinafter.

(4) A solid line D represents the speed command 131 selected by the speed command selection unit 130 illustrated in FIG. 3 at each time and is referred to as the command D hereinafter.

A dotted line E illustrated in FIG. 8(B) is the target pressure and represents the pressure command 123 illustrated in FIG. 3. A solid line F illustrated in FIG. 8(B) represents the pressure feedback signal 12 illustrated in FIG. 3 and is referred to as the signal F hereinafter.

In FIG. 8, time t1 represents the time when the command A becomes smaller than the speed B during the deceleration action; time t2 represents the time when the pressure starts increasing as the pressurizing head comes in contact with the workpiece; time t3 represents the time when the command C becomes smaller than the speed B; and time t4 represents the time when the pressure reaches the target pressure.

Having received the starting signal 23, the control unit 22 calculates the first speed command 111 in S3 to S4 illustrated in FIG. 7. If the position command 102 is tracked sufficiently well in the position control unit 110, the command speed acquired by the time differentiation of the position command can be deemed as equal to the first speed command 111, and in FIG. 8, the first speed command 111 is illustrated as substantially equal to the command speed.

In FIG. 8, a portion surrounded by the command A and the time axis corresponds to the amount of movement for the pressurizing head 5 to move to a position before the workpiece 6. The command A starts accelerating at the timing when the starting signal 23 is received and then, after keeping a constant speed for a while, starts decelerating. During the acceleration or the constant speed, the speed command selection unit 130 selects the command A as the command D, regardless of its magnitude in relation to the speed B and the command C, due to the processing in S6 and S7 in FIG. 7. Additionally, even when the command A is decelerating, the speed command selection unit 130 selects the command A if the command A is greater than the speed B, due to the processing in S7 and S8 in FIG. 7.

Furthermore, from the time t1 to the time t3 in FIG. 8, the command A is decelerating and the command A is equal to or less than the speed B. In this case, the speed command selection unit 130 selects, as the command D, the speed B, which is smaller than the command C, due to the processing in S10 and S11 in FIG. 7. Here, the command A allows a positioning action to the position before the workpiece 6; thus, the pressurizing head 5 does not come in contact with the workpiece 6 at the time t1. The motor 1 is controlled by the position control so as not to fail to track the command A, which is a specified time profile, up to the time t1, and thus, an effect of achieving a high speed feeding action is produced.

After an action performed for a while at the speed B, the pressurizing head 5 comes in contact with the workpiece 6. The signal F starts increasing at the time t2, which is the timing at which the contact is made. As the signal F increases to approach the target pressure E, the deviation between the pressure command and the pressure feedback decreases. Hence, due to the operation of the pressure control unit 120, which calculates the command C on the basis of the pressure deviation, the command C decreases gradually.

Since the command C becomes smaller than the speed B, the speed command selection unit 130 selects the command C as the speed command 131 at the time t3 and thereafter due to the processing in S10 and S12.

As described above, the motor control apparatus 20 according to the first embodiment controls the speed of the motor 1 such that, during a feeding action in which the pressurizing head 5 driven by the motor 1 approaches the workpiece 6, the speed of the motor 1 agrees with a first speed that causes the moving speed of the pressurizing head 5 to track a position command, and, at or after the timing when the first speed falls below the creep speed, controls the speed of the motor 1 such that the speed of the motor 1 agrees with a smaller one of the second speed that causes a pressure or a force detected by the load detection sensor 7 to track a pressure command and the creep speed. In this manner, the feeding action to approach the workpiece is performed by performing a positioning action from a state in which the pressurizing head 5 is not in contact with the workpiece 6 to a position before the workpiece 6 in which the pressurizing head 5 is not in contact with the workpiece 6. The motor control apparatus 20 performs positioning control on the pressurizing head 5 such that the pressurizing head 5 moves to the position before a position in which it comes in contact with the workpiece 6 and thereby allows the feeding action to be performed at a high speed and thus can shorten the cycle time that is related to processing on the workpiece 6.

Additionally, while the feeding action is being performed, the pressurizing head 5 does not come into contact with the workpiece 6; thus, the workpiece 6 and the pressurizing head 5 are not damaged.

Additionally, when the pressurizing head 5 has approached the workpiece 6 to a certain degree, i.e., during the deceleration action, which is the final stage of the positioning action described above, the motor control apparatus 20 performs the action at a smaller one of the speed B and the command C. The pressurizing head 5 comes into contact with the workpiece 6 at a speed equal to or less than the speed B at the moment when the contact with the workpiece 6 is made; thus, the transition to the pressurizing action of the pressurizing head 5 can be made without having an impact on the workpiece 6.

Additionally, the control unit 22 selects a smaller one of the speed B and the command C in place of the command A at the timing of the time t1. When a small value is set as the creep speed, the speed B tends to be smaller than the command C. As a result, the speed B is selected at the time t1 and thereby the command D becomes continuous at the time t1. By selecting a smaller one of the speed B and the command C as the command D successively during a time from the time t1, the command D is switched from the speed B to the command C at the time t3; thus, the command D is continuous even at the time t1 and thereafter. This causes the command D to be continuous from when the feeding action is commenced until the pressurizing action is completed, achieving the waveform as in FIG. 8 and enabling the series of the actions to be performed smoothly without generating a shock or a vibration.

To achieve the series of the actions involving the feeding action and the pressurizing action, the motor control apparatus 20 according to the first embodiment successively switches between the first speed command 111, the creep speed information 21C, and the second speed command 121 and inputs the result to the speed control unit 140 as the speed command 131. It may be envisaged that, to achieve such an operation, a switching flag is prepared and the first speed command 111, the creep speed information 21C, and the second speed command 121 are switched at a timing of the switching flag and that a filter typified by a low-pass filter is used to prevent discontinuities caused during switching between the first speed command 111, the creep speed information 21C, and the second speed command 121.

Such a method involving the use of a filter leads to a characteristic where a low-pass filter is inserted in a position control loop and a pressure control loop. A low-pass filter causes degradation in phase characteristic in a high frequency region, which in turn causes degradation in loop characteristic of the position control and the pressure control; thus, a problem may be caused that overshooting and vibration are generated in position and pressure responses.

In contrast, the motor control apparatus 20 according to the first embodiment uses no filter to perform the switching but automatically and directly switches between the first speed command 111, the creep speed information 21C, and the second speed command 121 at appropriate timings and uses the result as a speed command; thus, the problem that overshooting and vibration are generated in the position and pressure responses is not caused. Additionally, a user of the motor control apparatus 20 according to the first embodiment should input only the pressure information 21A, the amount-of-movement information 21B, and the creep speed information 21C to achieve the series of the actions including the feeding action and the pressurizing action; thus, an effect of reducing a setting effort is also obtained.

When the pressurizing action is finished, the pressurizing head 5 needs to be retracted temporarily in order to process the subsequent workpiece 6. To return the pressurizing head 5 to its initial position, processing is needed to switch from the pressure control being performed to the position control. In this situation, if the second speed command 121 is being selected as the speed command 131, an action to track the pressure is being performed in general, and thus, a position deviation has been generated. If, in such a case, the speed command 131 is switched from the second speed command 121 to the first speed command 111, the generated position deviation may cause the speed command to be large and thereby inflict a shock to the motor 1 and to the motion of the machine.

By performing the position control follow-up processing in S9 in FIG. 7 while the feeding action and the pressurizing action are being performed, i.e., when the creep speed information 21C or the second speed command 121 is being selected as the speed command 131, generation of a position deviation is prevented and thereby an effect of preventing a shock during an action to retract the pressurizing head 5 is produced.

When the gain of the position control unit 110 in FIG. 3 can be made sufficiently large and the tracking characteristic of the position control unit 110 is sufficiently high, the first speed command 111 can be deemed as equal to the command speed as illustrated in FIG. 4(B). In this case, although processing is performed in which the first speed command 111 is compared to the creep speed information 21C in S8 in FIG. 7, a configuration may be provided in which the control unit 22 uses a command speed that is the time derivative of the position command in place of the first speed command 111 and compare the command speed to the creep speed information 21C. Such a configuration can achieve the actions illustrated in FIG. 8 and also produce effects similar to those described above.

Furthermore, when the tracking characteristic of the position control unit 110 in FIG. 3 is high and the tracking characteristic of the speed command selection unit 130 in FIG. 3 is also sufficiently high because the gain of the speed command selection unit 130 can be made sufficiently large, the speed command 131 provided while the feeding action is being performed can be deemed as equal to the first speed command 111 and also to the speed feedback signal 2B. In such a case, a configuration in which the speed feedback signal 2B is used in place of the first speed command 111 and the speed feedback signal 2B is compared to the creep speed information 21C in S8 in FIG. 7 can achieve the actions illustrated in FIG. 8 and also produce effects similar to those described above. When the signal is used in place of the first speed command in S7 in FIG. 7, the processing in S7 in FIG. 7 still is that speed command=first speed command.

In the first embodiment, an example has been described in which the pressure feedback signal 12 is used as the output of the load detection sensor 7, although use of a force feedback signal can achieve similar actions and produce similar effects. In the case where a force feedback signal is used, the pressure command 123 is replaced by a force command signal, and the pressure control unit 120 multiplies the difference between the force command signal and the force feedback signal by a gain to output the second speed command 121. This is similarly applicable in other embodiments to be described hereinafter.

Second Embodiment

In the first embodiment, the first speed command 111 is calculated on the basis of the difference between the position command 102 and the position feedback signal 2A, although the calculation can be performed in a similar manner by using other types of position control. In a second embodiment, an example in which another type of position control is used will be described. Components identical with those in the first embodiment are designated with the identical symbols and their description is omitted, and different components only will be described here.

Figure 9:
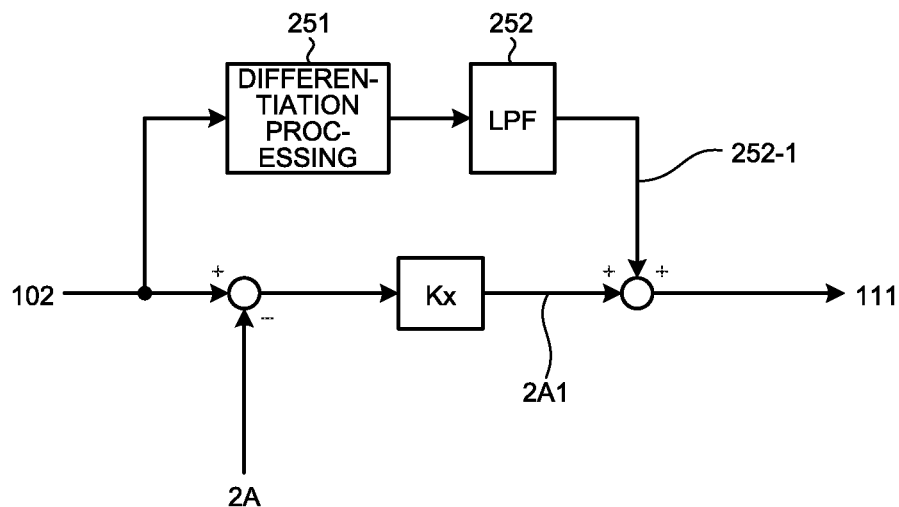
FIG. 9 is a diagram illustrating an exemplary configuration of a position control unit included in a motor control apparatus according to a second embodiment of the present invention.

FIG. 9 is a diagram illustrating an exemplary configuration of a position control unit included in a motor control apparatus according to the second embodiment of the present invention. A position control unit 110-2 illustrated in FIG. 9 is configured such that position control is performed in combination with feed-forward control. The position control unit 110-2 adds, to a feedback speed command 2A1, which is a signal obtained by multiplying the deviation between the position command 102 and the position feedback signal 2A by a gain element Kx, a feed-forward speed command 252-1, which is obtained by subjecting the result of differentiation of the position command 102 performed by differentiation processing 251 to a low-pass filter 252, and outputs the result as the first speed command 111.

Here, the low-pass filter 252 is used to calculate the feed-forward speed command 252-1, and the feed-forward speed command 252-1 is calculated in such a manner that the feed-forward speed command 252-1 is not dependent on the position feedback signal 2A. Thus, the feed-forward speed command 252-1 does not cause degradation in frequency characteristic in the control loop, in particular, in phase characteristic in a high frequency band.

When the position command 102 is smooth to a certain degree, the position control unit 110-2 may omit the processing performed by the low-pass filter 252. Additionally, if the feed-forward speed command 252-1 is the operation result of differentiation of the position command 102 or if the feed-forward speed command 252-1 and the operation result of the differentiation processing and the low-pass filter processing have an equivalent value, the calculation method is not limited to that described above and any method can be used.

In the second embodiment, by adding the feed-forward speed command 252-1 to the first speed command 111, a behavior is exhibited in such a manner that the feed-forward speed command 252-1 is directly input to the speed control unit 140. Hence, the tracking characteristic of the position feedback signal 2A with respect to the position command 102 is improved and thereby the approaching action to the subject to be pressurized can be achieved in a further shorter time.

The position control unit 110 that calculates the first speed command 111 by using only the position feedback signal 2A as illustrated in FIG. 5 in particular may cause a motor oscillation if the gain Kx is increased. In contrast, the position control unit 110-2 that uses also the feed-forward speed command 252-1 as illustrated in FIG. 9 can prevent the problem as described above from occurring. By using the position control unit 110-2 in FIG. 9, a behavior is exhibited in such a manner that a speed feedback signal close to the feed-forward speed command 252-1 is obtained. In the case where the position control unit 110-2 as described above is used, the series of the feeding action and the pressurizing action can be also achieved by the processing illustrated in the flowchart of FIG. 7. In this case, the first speed command 111 that is the total value of the feed-forward speed command 252-1 and the feedback speed command 2A1 illustrated in FIG. 9 is used. Additionally, as in the case with the first embodiment, a command speed that is a time derivative of the position command or a speed feedback signal may be used in place of the first speed command 111 in S8 illustrated in FIG. 7.

When the feed-forward speed command 252-1 is used, the feed-forward speed command 252-1 may be used in addition to the command speed and the speed feedback signal 2B in S8 in FIG. 7. While the first speed command 111 is a signal dependent on the position feedback signal 2A, the feed-forward speed command 252-1 is generated only from the position command 102 in a manner not depended on the position feedback signal 2A or the speed feedback signal 2B. The position feedback signal 2A is a signal detected by the encoder 2 illustrated in FIG. 1 and may be affected by noise depending on the characteristics and performance of the encoder 2 and the environment in which the encoder 2 is installed. If the noise is included in the position feedback signal 2A, the first speed command 111 may also be affected by the noise. When such a first speed command 111 is used in S8 in FIG. 7, the timing of an action to switch from a smaller one of the creep speed information 21C and the first speed command 111 may be slightly shifted due to the influence of the noise, and this may cause the speed command to be discontinuous and thereby cause a shock.

In contrast, in the configuration in which the feed-forward speed command 252-1 is used in place of the first speed command in S8 in FIG. 7, the feed-forward speed command 252-1 is not affected by noise; thus, the timing of the switching action is not shifted, and thereby the speed command does not become discontinuous and no shock is caused. Although no effect of the noise caused in the encoder 2 is present when the command speed is used in S8 in FIG. 7 as in the case with the feed-forward speed command 252-1, the feed-forward speed command 252-1 is closer to the actual motion of the action and thus, the use of the feed-forward speed command 252-1 in S8 in FIG. 7 can achieve the switching of the actions at a more appropriate timing.

Third Embodiment

While an exemplary configuration in which the second speed command 121 is generated by the P control in the first embodiment, another exemplary configuration in which the second speed command 121 is generated by the PI control will be described in a third embodiment. Components identical with those in the first embodiment are designated with the identical symbols and their description is omitted and different components only will be described here.

Figure 10:
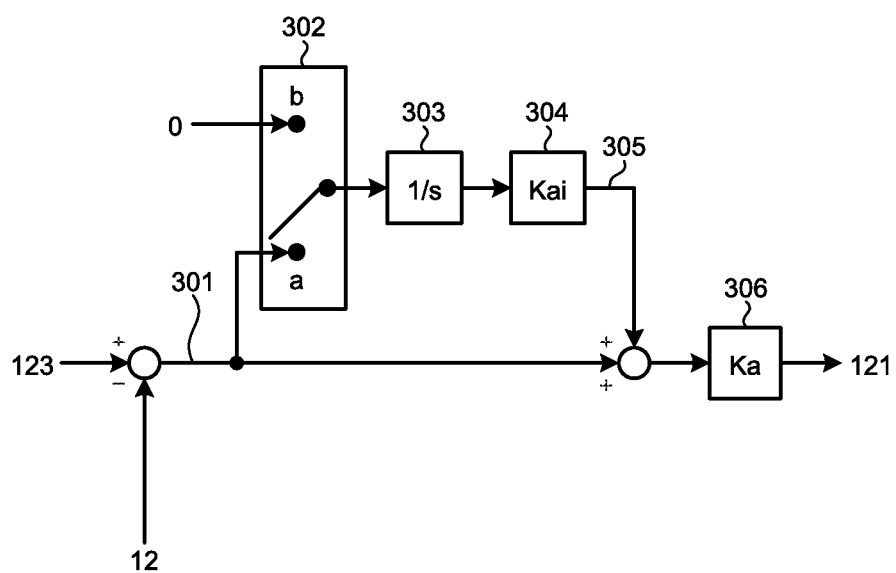
FIG. 10 is a diagram illustrating an exemplary configuration of a pressure control unit included in a motor control apparatus according to a third embodiment of the present invention.

FIG. 10 is a diagram illustrating an exemplary configuration of a pressure control unit included in a motor control apparatus according to the third embodiment of the present invention. A pressure control unit 120-3 illustrated in FIG. 10 is configured such that the responsiveness of pressure is improved by the PI control. In the pressure control unit 120-3, when a switch included in an integrator input selection unit 302 is on the a side, a pressure deviation 301, which is the difference between the pressure command 123 and the pressure feedback signal 12, is input to an integrator 303. Additionally, in the pressure control unit 120-3, when the switch included in the integrator input selection unit 302 is on the b side, zero is input to the integrator 303. When the integrator input selection unit 302 turns the switch to the a side and to the b side will be described hereinafter.

The integrator 303 performs integration processing on a signal that has been input to the integrator 303. Here, s in the drawing represents a Laplace operator and 1/s represents the integral action. Furthermore, the pressure control unit 120-3 multiplies the output of the integrator 303 by Kai 304, which is a pressure integration gain, to calculate an integration control output 305. The pressure control unit 120-3 multiplies a signal obtained by adding the integration control output 305 to the pressure deviation 301 by a gain Ka, which is a pressure proportional gain 306, to calculate the second speed command 121.

Processing of the motor control apparatus 20 according to the third embodiment will now be described.

Figure 11:
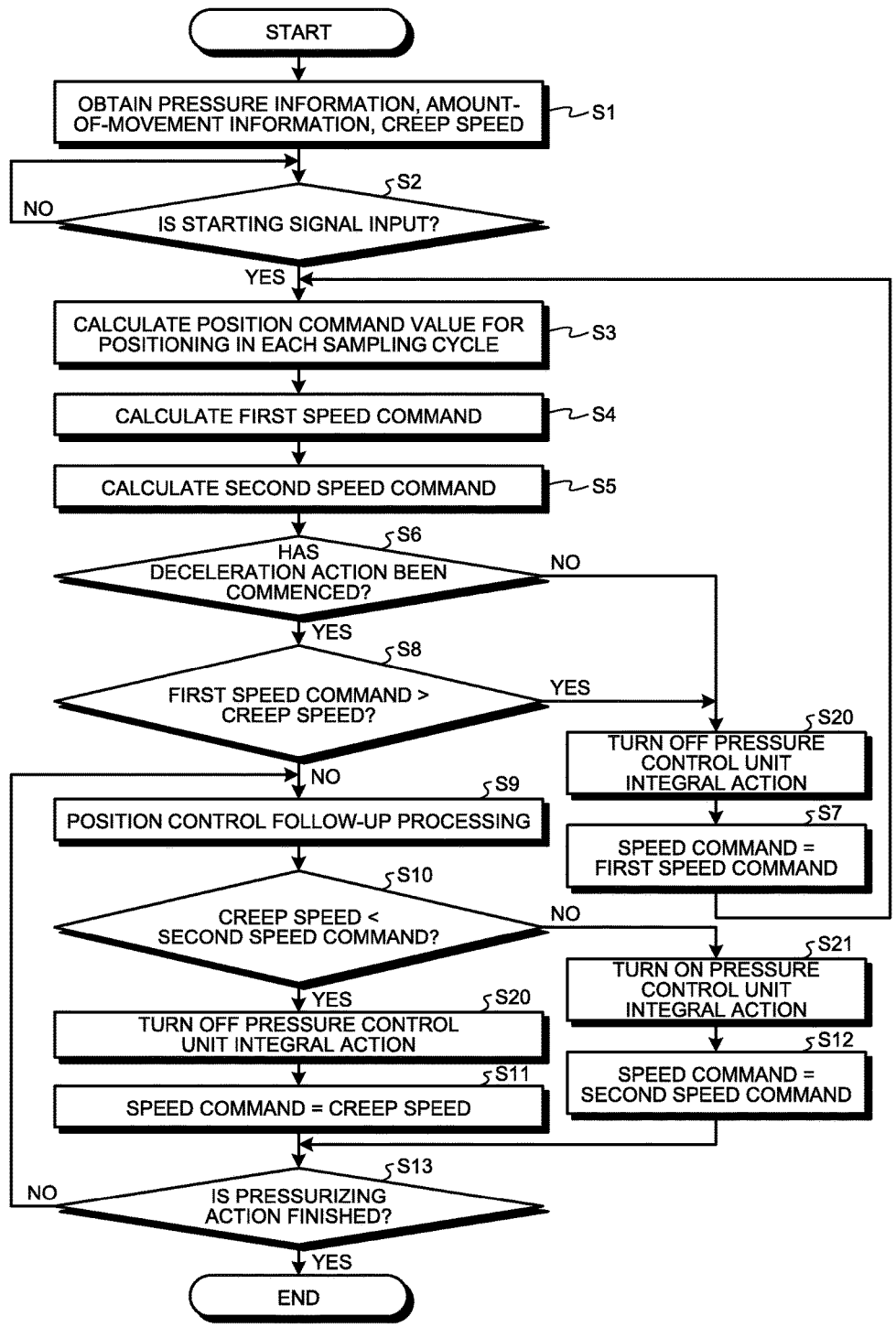
FIG. 11 is a flowchart for describing the operation of the motor control apparatus according to the third embodiment of the present invention.

FIG. 11 is a flowchart for describing the operation of the motor control apparatus according to the third embodiment of the present invention. The flowchart illustrated in FIG. 11 includes identical processing with that in the flowchart illustrated in FIG. 7, and the control unit 22 of the motor control apparatus according to the third embodiment performs processing in a basically identical flow with that in the flowchart illustrated in FIG. 7.

The differences from the flowchart of FIG. 7 are as follows.

(1) Processing of S20 is inserted before the first speed command 111 is selected as the speed command 131 in S7, and processing to turn off the integral action of the pressure control unit 120-3 is performed in S20.

(2) Before the processing to select the creep speed as the speed command 131 in S11, the processing to turn off the integral action of the pressure control unit 120-3 is performed in S20.

(3) Before the second speed command 121 is selected as the speed command 131 in S12, processing to turn on the integral action of the pressure control unit 120-3 is performed in S21.

Here, turning off the integral action of the pressure control unit 120-3 refers to processing to turn the switch of the integrator input selection unit 302 in the pressure control unit 120-3 in FIG. 10 to the b side, so that the input to the integrator 303 is zero and thereby the action of the integrator 303 is deactivated. Note that, when the switch is turned to the b side, a signal obtained by multiplying the difference between the pressure command 123 and the pressure feedback signal by the gain Ka, which is the pressure proportional gain 306, is output as the second speed command 121. Turning on the integral action of the pressure control unit 120-3 refers to processing to turn the switch of the integrator input selection unit 302 in the pressure control unit 120-3 in FIG. 10 to the a side, so that the normal integral action is performed.

By performing such processing, the integral action of the pressure control unit 120-3 can be activated in the case where the second speed command 121 is selected as the speed command 131, and in the other cases, i.e., when the first speed command 111 or the creep speed is selected as the speed command 131, the integral action of the pressure control unit 120-3 can be stopped.

The integral action of the pressure control unit 120-3 integrates the pressure deviation 301, so that the amount of operation, i.e., the speed command 131 of the motor 1, is increased in accordance with the generated pressure deviation 301 and thereby the time taken for the pressure deviation 301 to become zero is reduced. If, hypothetically, the integral action is always activated unlike the third embodiment, the integral action is valid also during the feeding action when the pressurizing head 5 is not in contact with the workpiece 6. When the pressurizing head 5 is not in contact with the workpiece 6, there is no pressure generated, i.e., the pressure is zero; thus, the output of the integrator 303 becomes excessive when the pressurizing head 5 is not in contact with the workpiece 6. This causes the second speed command 121 to also become excessive. When the feeding action is completed, the processing to select a smaller one of the second speed command 121 and the creep speed as the speed command is performed. Since the output of the integrator 303 of the pressure control unit 120-3 is large, the creep speed is not switched to the second speed command 121 soon enough and thereby a problem is caused that the pressurizing action is not commenced soon enough.

The pressure control unit 120-3 according to the third embodiment causes the integral action of the pressure control unit 120-3 to be valid only when the second speed command 121 is selected as the speed command 131. Additionally, the pressure control unit 120-3 according to the third embodiment causes only the pressure proportional gain 306 of the pressure control unit 120-3 to be valid when the first speed command 111 or the creep speed is selected as the speed command 131. Thus, the problem described above can be prevented. Additionally, the pressure control unit performs the PI control including the integral action during the pressure control in which the second speed command is selected; thus, the tracking characteristic of the pressure feedback control with respect to the pressure command is improved and thereby the pressurizing action on the workpiece is performed accurately.

If the integral action of the pressure control unit 120-3 is always active, the increased output of the integrator may also cause a problem that overshooting and vibration of the pressure are caused at the moment when the speed command 131 is switched to the second speed command 121. In the third embodiment, which is configured to include the integral action in the pressure control unit 120-3, can prevent such overshooting and vibration of the pressure.

Figure 12:
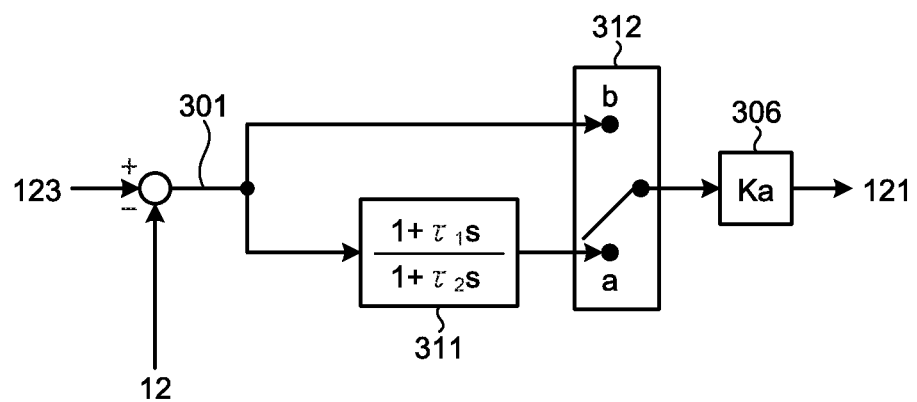
FIG. 12 is a diagram illustrating a modification of the pressure control unit illustrated in FIG. 10.

For the purpose of improving transient response, the pressure control unit 120-3 may use control including phase delay compensation or phase advance compensation, in addition to the integral action. FIG. 12 is a diagram illustrating a modification of the pressure control unit illustrated in FIG. 10. In a pressure control unit 120-3A illustrated in FIG. 12, a phase delay/advance compensation unit 311, which is a phase compensation unit, performs the phase delay compensation or the phase advance compensation on the pressure deviation 301.

Here, $\tau_1$ and $\tau_2$ are parameters of the phase delay/advance compensation unit 311. The phase delay/advance compensation unit 311 performs the phase delay compensation when $\tau_1 < \tau_2$ and performs the phase advance compensation when $\tau_1 > \tau_2$. A phase delay/advance compensation selection unit 312 selects the output of the phase delay/advance compensation unit 311 when a switch is on the a side and selects the pressure deviation 301 when the switch is on the b side. The pressure control unit 120-3A multiplies the result of such an operation by the pressure proportional gain 306 to calculate the second speed command 121. In the manner described above, the pressure control unit 120-3A stops the phase delay compensation or the phase advance compensation in a case other than a case in which the second speed command 121 is selected in the speed command selection unit 130.

The control unit 22 including the pressure control unit 120-3A of FIG. 12 operates in accordance with the flowchart of FIG. 11 in principle. Note, though, that the processing in S20 in FIG. 11 is replaced by the processing of deactivating the phase delay/advance compensation, specifically, turning the switch of the phase delay/advance compensation selection unit 312 in FIG. 12 to the b side, and the processing in S21 is replaced by the processing of activating the phase delay/advance compensation, i.e., turning the switch of the phase delay/advance compensation selection unit 312 in FIG. 12 to the a side.

If the phase delay compensation or the phase advance compensation is always performed when the pressurizing head 5 is not in contact with the workpiece 6 as in the case of the feeding action, a problem similar to that caused when the integral action is always activated occurs. When the pressurizing head 5 is not in contact with the workpiece 6 as in the case of the feeding action, i.e., when the first speed command 111 or the creep speed is selected as the speed command, the pressure control unit 120-3A in FIG. 12, which includes the phase delay compensation or the phase advance compensation, does not perform the action of the phase delay compensation or the phase advance compensation, leaving only the pressure proportional gain 306 of the pressure control unit 120-3A valid, and thus the problem described above can be prevented from occurring. Additionally, the pressure control unit performs the phase delay compensation or the phase advance compensation during the pressure control in which the second speed command is selected; thus, the tracking characteristic of the pressure feedback control with respect to the pressure command is improved and thereby the pressurizing action on the workpiece is performed accurately.

Additionally, the third embodiment is different from the first and second embodiments in only the configuration of the pressure control unit 120-3A in principle and thus can obtain similar effects to those described in the first and second embodiments.

Figure 13:
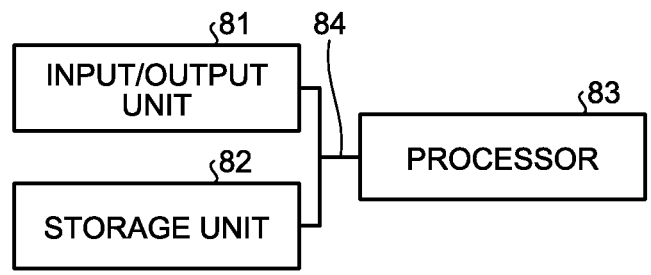
FIG. 13 is a hardware configuration diagram of the motor control apparatus according to the first to third embodiments of the present invention.

FIG. 13 is a hardware configuration diagram of the motor control apparatus according to the first to third embodiments of the present invention. The motor control apparatus 20 according to each of the embodiments includes an input/output unit 81, a storage unit 82, and a processor 83, and the input/output unit 81, the storage unit 82, and the processor 83 are mutually connected by a data bus 84.

The input/output unit 81 is an interface circuit for allowing the storage unit 82 to store information transmitted from an external device and allowing the processor 83 to transmit and receive information to and from the external device. In each of the embodiments, the position feedback signal 2A, the speed feedback signal 2B, the pressure information 21A, the amount-of-movement information 21B, the creep speed information 21C, and the pressure feedback signal 12 illustrated in FIG. 1 are input to the input/output unit 81, and the current 11 is output to the motor 1 via the input/output unit 81.

Examples of the types of the storage unit 82 can include a RAM (Random Access Memory), a ROM (Read Only Memory), and an SSD (Solid State Drive). The storage unit 82 stores a program for the processor 83. Additionally, the storage unit 82 temporarily stores various types of information that is input via the input/output unit 81.

The processor 83 is a circuit such as a CPU (Central Processing Unit) or an MPU (Micro Processing Unit). The processor 83 includes the control unit 22 illustrated in FIG. 3. By causing the processor 83 to execute the program stored in the storage unit 82, the control unit 22 is implemented.

Note that the configurations described in the foregoing embodiments are examples of the present invention; combining the present invention with other publicly known techniques is possible, and partial omissions and modifications are possible without departing from the spirit of the present invention.

REFERENCE SIGNS LIST 1 motor, 1A rotation shaft, 2 encoder, 2A position feedback signal, 2A1 feedback speed command, 2B speed feedback signal, 3 ball screw, 4 coupling, 5 pressurizing head, 6 workpiece, 7 load detection sensor, 8 table, 11 current, 12 pressure feedback signal, 20 motor control apparatus, 21 action information setting unit, 21A pressure information, 21B amount-of-movement information, 21C creep speed information, 22 control unit, 23 starting signal, 101 position command generation unit, 102 position command, 110 position control unit, 110-2 position control unit, 111 first speed command, 120 pressure control unit, 120-3 pressure control unit, 120-3A pressure control unit, 121 second speed command, 122 pressure command generation unit, 123 pressure command, 130 speed command selection unit, 131 speed command, 140 speed control unit, 141 current command, 150 current control unit, 251 differentiation processing, 252 low-pass filter, 252-1 feed-forward speed command, 301 pressure deviation, 302 integrator input selection unit, 303 integrator, 305 integration control output, 306 pressure proportional gain, 311 phase delay/advance compensation unit, 312 phase delay/advance compensation selection unit.

The invention claimed is:

1. A motor control apparatus that controls a motor that includes an encoder, the motor control apparatus comprising:
 a position command generator to generate a position command that is a command value that causes a mechanical load driven by the motor to approach a subject to be pressurized and that causes a final position of the mechanical load to be before the subject to be pressurized at a certain distance from the subject to be pressurized;
 a position controller to output a first speed command such that a position of the motor detected by the encoder tracks the position command;
 a pressure command generator to generate a pressure command that is a command value of a pressure or a force to be applied to the subject to be pressurized;
 a pressure controller to output a second speed command such that, when the mechanical load is pressed against the subject to be pressurized, a pressure or a force detected on the mechanical load tracks the pressure command;
 a speed command selector to select one of a creep speed that specifies an upper limit of a speed of the motor to be used when the mechanical load comes into contact with the subject to be pressurized, the first speed command, and the second speed command and output the selected one of the creep speed, the first speed command, and the second speed command as a speed command for the motor to operate; and a speed controller to output a current command for supplying a current to the motor such that the speed of the motor tracks the speed command output by the speed command selector, wherein after the speed command selector selects the first speed command, the speed command selector selects one of the second speed command and the creep speed that has a smaller value at and after a timing when the first speed command falls below the creep speed.

2. The motor control apparatus according to claim 1, wherein the position controller calculates a feedback speed command on a basis of a deviation between the position command and the position of the motor and outputs the feedback speed command as the first speed command.

3. The motor control apparatus according to claim 2, wherein the speed command selector calculates the speed command by selecting the first speed command as the speed command when starting is commenced and selecting successively a smaller one of the second speed command and the creep speed at and after a timing when the first speed command that is output from the position controller falls below the creep speed during a deceleration action of position control in which an operation tracks the position command.

4. The motor control apparatus according to claim 2, wherein the speed command selector calculates the speed command by selecting the first speed command as the speed command when starting is commenced and selecting successively a smaller one of the second speed command and the creep speed at and after a timing when a command speed that is a result of differentiation of the position command falls below the creep speed during a deceleration action of position control in which an operation tracks the position command.

5. The motor control apparatus according to claim 2, wherein the speed command selector calculates the speed command by selecting the first speed command as the speed command when starting is commenced and selecting successively a smaller one of the second speed command and the creep speed at and after a timing when the feedback speed command falls below the creep speed during a deceleration action of position control in which an operation tracks the position command.

6. The motor control apparatus according to claim 1, wherein the position controller adds, to a feedback speed command calculated on a basis of a deviation between the position command and the position of the motor, a feed-forward speed command calculated by a differentiation operation of the position command and outputs a result as the first speed command.

7. The motor control apparatus according to claim 6, wherein the speed command selector calculates the speed command by selecting the first speed command as the speed command when starting is commenced and selecting successively a smaller one of the second speed command and the creep speed at and after a timing when the feed-forward speed command falls below the creep speed during a deceleration action of position control in which an operation tracks the position command.

8. The motor control apparatus according to claim 6, wherein the speed command selector calculates the speed command by selecting the first speed command as the speed command when starting is commenced and selecting successively a smaller one of the second speed command and the creep speed at and after a timing when the first speed command that is output from the position controller falls below the creep speed during a deceleration action of position control in which an operation tracks the position command.

9. The motor control apparatus according to claim 6, wherein the speed command selector calculates the speed command by selecting the first speed command as the speed command when starting is commenced and selecting successively a smaller one of the second speed command and the creep speed at and after a timing when a command speed that is a result of differentiation of the position command falls below the creep speed during a deceleration action of position control in which an operation tracks the position command.

10. The motor control apparatus according to claim 6, wherein the speed command selector calculates the speed command by selecting the first speed command as the speed command when starting is commenced and selecting successively a smaller one of the second speed command and the creep speed at and after a timing when the feedback speed command falls below the creep speed during a deceleration action of position control in which an operation tracks the position command.

11. The motor control apparatus according to claim 1, wherein, when the mechanical load is not in contact with the subject to be pressurized, the pressure controller stops an integral action to integrate a pressure deviation between the pressure command and the pressure or the force detected on the mechanical load.

12. The motor control apparatus according to claim 1, wherein, when the speed command selector selects the creep speed or the second speed command, the position controller overwrites the position command with the position of the motor detected by the encoder.

13. The motor control apparatus according to claim 1, wherein the pressure controller comprises a phase compensator to perform phase delay compensation or phase advance compensation on a pressure deviation between the pressure command and the pressure or the force detected on the mechanical load, and the pressure controller stops the phase delay compensation or the phase advance compensation in a case other than a case in which the second speed command is selected in the speed command selector.

14. A motor control apparatus that controls a moving speed of a mechanical load driven by a motor that includes an encoder, wherein the moving speed of the mechanical load is controlled so as to agree with a first speed that causes a position of the motor detected by the encoder to track a position command, and, at or after a timing when the first speed falls below a creep speed that specifies an upper limit of a speed of the motor to be used when the mechanical load comes into contact with a subject to be pressurized, the moving speed of the mechanical load is controlled so as to agree with a smaller one of a second speed that causes a pressure or a force detected on the mechanical load to track a pressure command and the creep speed.

* * * * *